UNITED STATES PATENT OFFICE.

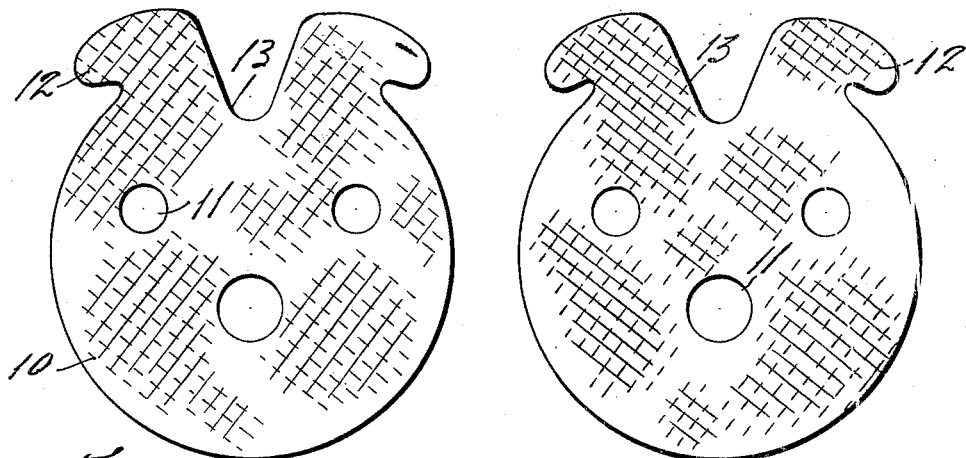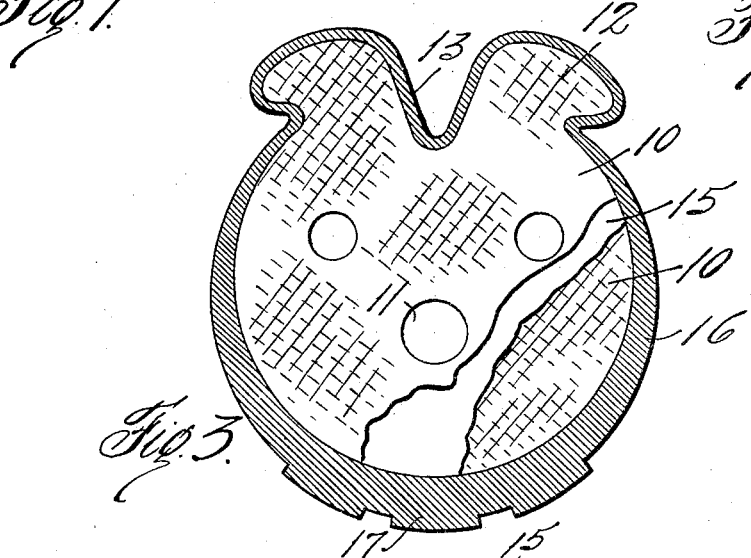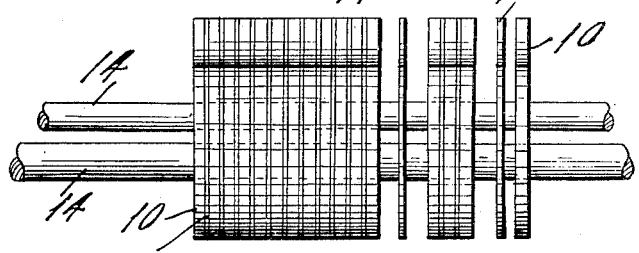

FRED W. STRANG, OF DALLAS, TEXAS, ASSIGNOR TO GIBRALTAR TIRE & RUBBER COMPANY, OF DALLAS, TEXAS, A COMMON LAW COMPANY HAVING AS ITS TRUSTEES FRED W. STRANG, JUSTIN C. DASPIT, AND JOSEPH C. SLOAN, ALL OF DALLAS, TEXAS.

PROCESS OF MAKING CUSHION-TIRES.

1,346,389.  Specification of Letters Patent.  Patented July 13, 1920.

Application filed September 8, 1919. Serial No. 322,325.

*To all whom it may concern:*

Be it known that I, FRED W. STRANG, a citizen of the United States, residing at Dallas, in the county of Dallas and State of Texas, have invented certain new and useful Improvements in Processes of Making Cushion-Tires, of which the following is a specification.

This invention relates to new and useful improvements in cushion tires and processes of producing the same.

The process involves the cutting of blanks from rubber-fabric material and assembling these blanks in alternate relation with crude rubber blanks, and then partially vulcanizing the blanks whereby the rubber is made solvent and the whole assemblage made homogeneous. The blanks are subjected to pressing while being vulcanized and the density depends largely upon the degree of pressure.

The next step consists in placing the core which has been formed with the blanks, in a circular mold and coating said core with crude rubber to form a tread and a rubber jacket completely surrounding the core. The vulcanizing is completed so that the rubber and fabric are thoroughly cooked together.

To form the rubber-fabric blanks from new material would be very expensive and an economical feature is the cutting of the blanks from discarded cord tire casings from which the treads have been removed. The cords in such tire casings are disposed in layers, the cords of one layer crossing those of the next layer at right angles thereto. It will be seen that when the blanks are assembled in my tire, the cords will lie in radial planes at right angles to each other, and further that the ends and not the sides of cords, will be presented on the wearing surface. Such a structure will not disintegrate and these tires will retain their shape and wear with satisfaction to the rim of the wheel. By reclaiming discarded or "junk" casings my tires can be produced at an extremely low cost.

The invention will be more readily understood from a reading of the following specification and by reference to the accompanying drawings, in which an example of the invention is shown, and wherein:

Figure 1 is a plan view of one of the rubber-fabric blanks,

Fig. 2 is a similar view showing the cords at right angles to Fig. 1,

Fig. 3 is a broken section through a complete tire, and

Fig. 4 is a side elevation of a number of blanks arranged on the assembling rods.

In the drawings the numeral 10 designates a rubber-fabric blank having a shape substantially the same as that exhibited by a cross-section of a rubber tire. The blank is formed of layers of cord embedded in rubber, the cords of one layer crossing those of the next layers at right angles thereto as is indicated by full and dotted lines in Figs. 1 and 2. By disposing the layers of cords at right angles the completed tire will be stronger and the cords of one layer will resist a strain in line with cords of another layer which latter is at right angles to the cords of the first layer and further if the cords all extended in the same general direction, the tire might have a tendency to split circumferentially. The blanks may be stamped from new material, but such a step would be very expensive and under some conditions prohibited. In order that the blanks may be economically produced, and discarded tire casings reclaimed, said blanks are preferably stamped from discarded cord tire casings which would otherwise be thrown away.

Before the blanks are cut the tread rubber and undesirable portions of the casings are cut off and the casings buffed. It is obvious that a large number of blanks may be obtained from such casings. Each blank is provided with a plurality of holes 11 in triangular relation at the central portion. Bead portions 12 are formed on each blank with a V-shaped recess therebetween.

In carrying out the process a plurality of rods 14, one for each hole 11, are provided. The blanks are assembled on these rods and between each blank 10 a thin blank 15 of crude or unvulcanized rubber, such as is used for vulcanizing rubber and fabric together. The blanks 15 preferably have the same shape as the blanks 10, but this is not essential. After a sufficient number of blanks have been assembled on the rods 14, the same are placed under pressure and at the same time partially vulcanized in a suitable apparatus (not shown). A pressure of eight hundred pounds has been found to be satisfactory. The vulcanizing makes the rubber blanks 15 and the rubber in the blanks 10 sufficiently solvent or plastic to unite and form a homogeneous mass or core by reason of the pressure which is exerted.

The core is preferably made of such a length as to give the required circumference when pressed in a circular mold (not shown), although it is obvious that the core might be made in sections and assembled in said mold. Unvulcanized rubber is applied to the core so as to completely surround or incase the same and form a jacket 16 having a thickened tread portion 17 as is shown in Fig. 3. The core and jacket are vulcanized so as to properly cure the tire. The jacket forms a protective coating for the ends of the cords embedded in the blanks 10, but it is to be understood the tire is not to depend upon wearing through the jacket because the tire may be used until the core is worn down to the rim. The openings 11 form air spaces which lend to the resiliency, and the recesses 13 becomes a channel in the rubber tire which permits the bead portions to be compressed in pressing the tire on a rim.

What I claim, is:

1. The process of making cushion tires which includes forming a plurality of rubber-fabric blanks, then assembling said blanks with alternate blanks of rubber therebetween, then forming a core by subjecting the blanks to a considerable pressure and vulcanization, and then disposing the core in a circular shape and vulcanizing a rubber jacket around the core.

2. The process of making cushion tires which includes forming a plurality of rubber-fabric blanks, then assembling the blanks with their faces adjacent and with blanks of rubber disposed therebetween, then forming a core by subjecting the blanks to a considerable pressure longitudinally and at the same time vulcanizing the core, and then disposing the core in a circular form and vulcanizing a rubber jacket around the core.

3. The process of making cushion tires which includes stamping a plurality of blanks from cord tire casings so that the cords extend lengthwise of the blanks, and providing the blanks with one or more transverse openings, then assembling the blanks on one or more rods passing through the openings of the same and disposing between the blanks other blanks of rubber, then subjecting the blanks to a considerable pressure longitudinally of the assemblage and vulcanizing the same to form a core, and then removing the core from the rods and placing the same in circular form and vulcanizing a rubber jacket around the core.

4. The process of making cushion tires which includes stamping a plurality of blanks from cord tire casings, then assembling said blanks in successive order, then vulcanizing said blanks together with rubber therebetween to form a core, and then incasing the core in a circular jacket by means of vulcanization.

In testimony whereof I affix my signature.

FRED. W. STRANG.